United States Patent
Kobayashi et al.

(10) Patent No.: US 6,200,631 B1
(45) Date of Patent: *Mar. 13, 2001

(54) METHOD FOR PRODUCING CORROSION RESISTANT REFRACTORIES

(75) Inventors: William Thoru Kobayashi, Sao Paulo; Elson Longo Da Silva; Carlos Alberto Paskocimas, both of Sao Carlos, all of (BR)

(73) Assignee: Praxair Technology, Inc., Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,560

(22) Filed: Oct. 27, 1997

(51) Int. Cl.$^7$ ...................................................... B05D 3/02
(52) U.S. Cl. ......................... 427/140; 427/226; 427/314; 427/376.2; 264/30; 264/36.11; 264/36.18
(58) Field of Search .................................. 427/226, 229, 427/376.2, 314, 140; 264/36.11, 36.18, 30

(56) References Cited

U.S. PATENT DOCUMENTS 3,330,697   7/1967   Pechini.
3,925,575 * 12/1975 Church et al. ........................ 427/226
3,944,683 *  3/1976 Church et al. ........................ 427/226
4,267,210 *  5/1981 Yajima et al. ........................ 427/226

FOREIGN PATENT DOCUMENTS 19549057   1/1997   (DE).
1292157   10/1972   (GB).
1569474    6/1980   (GB).

OTHER PUBLICATIONS

Boillet et al., "Corrosion of Silica and Mullite Refractories used in Glass Furnaces under 100% Oxy–Firing Process", Ceramic Engineering and Science Proceeding vol. 17, No. 2 (1996).
Boillet et al., "The Influence of Oxy–Fuel Combustion Atmosphere in Glass Furnaces on Refractory Corrosion", Apr. 14, 1996.

* cited by examiner

Primary Examiner—Shrive Beck
Assistant Examiner—Michael Barr
(74) Attorney, Agent, or Firm—Donald T. Black

(57) ABSTRACT

Silica-based refractories are impregnated with protective material that is more resistant towards attack by corrosive species. The protective material coats the surface of the refractory matrix and fills some of the cavity volume of its pores, crevices, surfaces imperfections and irregularities. The protective material is positioned by impregnating the refractory with a precursor which, under the input of energy, is converted into the corrosion resistant protective material.

6 Claims, 4 Drawing Sheets

METHOD FOR PRODUCING CORROSION RESISTANT REFRACTORIES

FIELD OF THE INVENTION

This invention relates generally to preventing corrosion of refractories used in high temperature processes. More particularly, the invention relates to preventing corrosion of silica-based refractories exposed to compounds containing alkali or alkaline-earth metals.

BACKGROUND OF THE INVENTION

In the manufacturing of glass articles, raw materials are converted at high temperature into a homogeneous melt which can be formed into the articles. Sand is the most common ingredient in glassmaking. Other commonly used glass forming materials are soda ash, calcium limestone, dolomitic limestone, aragonite, feldspar, nepheline, litharge, boron-containing compounds, various fining, coloring and oxidizing agents as well as broken glass also known as cullet. In addition to soda ash ($Na_2CO_3$), a number of other alkaline or alkaline-earth compounds are used during glass making. Examples include caustic soda or NaOH and various carbonates such as $K_2CO_3$, $Li_2CO_3$, $MgCO_3$, $CaCO_3$, $SrCO_3$ and $BaCO_3$.

Melting glass forming materials takes place in a melting unit, for example a melting pot, vessel, tank or furnace. Since the temperatures required to melt glass forming materials are among the highest needed to operate industrial furnaces, special materials are necessary to line the interior surfaces of these glassmelting units.

An additional challenge during glass melting is presented by the corrosive nature of the process itself. Refractory linings are exposed to both physical and chemical attack from molten glass and from some of the vapors generated during the high temperature melting operation. Particularly corrosive are vapors produced from those glassmaking ingredients containing alkaline and alkaline-earth species.

One advance made in glass melting pertains to directly fired furnaces and involves combustion processes where the conventional oxidant, air, is replaced with pure oxygen or with oxygen enriched air. Oxygen-based combustion results in even higher furnace temperatures. For example, the flue gases produced have temperatures generally exceeding 2000° F., typically between 2400° F. and 2800° F.

Not only are refractories lining these furnaces exposed to higher temperatures, but also oxygen-based combustion influences the corrosion effects attributed to compounds containing alkali and alkaline-earth metals. The relatively low gas velocities present in oxygen-fired furnaces slows the mass transfer rate, leading to a reduction in the amount of species volatilized from the glass melt and due to the significant reduction in nitrogen, the partial pressure of all components present in the furnace atmosphere increases and the concentration of vapors containing alkaline or alkaline-earth species can be as much as three to four times higher when compared to concentrations found in conventional air-fired furnaces.

Many existing furnaces employ silica-based refractories. Although materials that can better withstand corrosion are available, such as, for example, zirconia-based refractories, replacing conventional silica linings with more advanced materials imposes significant capital expenses and often requires modifications in the furnace structure, since nobler refractories tend to have a higher density than those containing silica.

There continues to be a need, therefore, to prevent, control or reduce the effects of corrosion observed in glass melting furnaces lined with conventional silica-based refractory materials, especially when such furnaces are operated under oxy-fuel conditions.

Accordingly, it is an object of the invention to provide silica-based refractories having improved corrosion resistance.

SUMMARY OF THE INVENTION

The above and other objects, which will become apparent to one skilled in the art upon a reading of this disclosure, are attained by the present invention, one aspect of which is:

A process for producing silica-based refractory having improved corrosion resistance comprising:
   (A) providing a silica-based refractory;
   (B) impregnating the silica-based refractory with a precursor capable of being converted into a protective material; and
   (C) providing energy to the silica-based refractory impregnated with said precursor and converting said precursor to said protective material thereby producing a silica-based refractory impregnated with said protective material having improved corrosion resistance.

Another aspect of the invention is:

A silica-based refractory article having improved corrosion resistance comprising:
   (A) a silica refractory matrix; and
   (B) a protective material impregnated onto the silica refractory matrix.

As used herein the term "rotective material" means a chemical compound other than silica which is more resistant to attack by corrosive compounds than is the refractory itself. For example, a protective material may be inert or less reactive in the corrosive environment of a particular application than the unprotected refractory; or, if the protective material does react with the corrosive species and/or with the refractory matrix, the rate of mass loss and wear observed for refractories impregnated with the protective material is lower than that exhibited, under similar conditions, by the unprotected refractory.

As used herein the terms "impregnate" or "impregnation" of a refractory or a refractory matrix means the penetration into pores, crevices, surface irregularities and/or imperfections of a silica-based refractory (matrix) and occupying at least a fraction of the total cavity volume of the pores, crevices, irregularities and/or imperfections.

As used herein the term "precursor solution" means precursors dissolved, dispersed, suspended or emulsified in a liquid medium.

As used herein the terms "alkali" or "alkaline" means metals of the first main group of the periodic table, in particular lithium, sodium and potassium.

As used herein the term "alkaline-earth" means elements of the second main group of the periodic table, especially beryllium, magnesium, calcium, strontium, and barium.

DETAILED DESCRIPTION OF THE INVENTION

Figure 1:
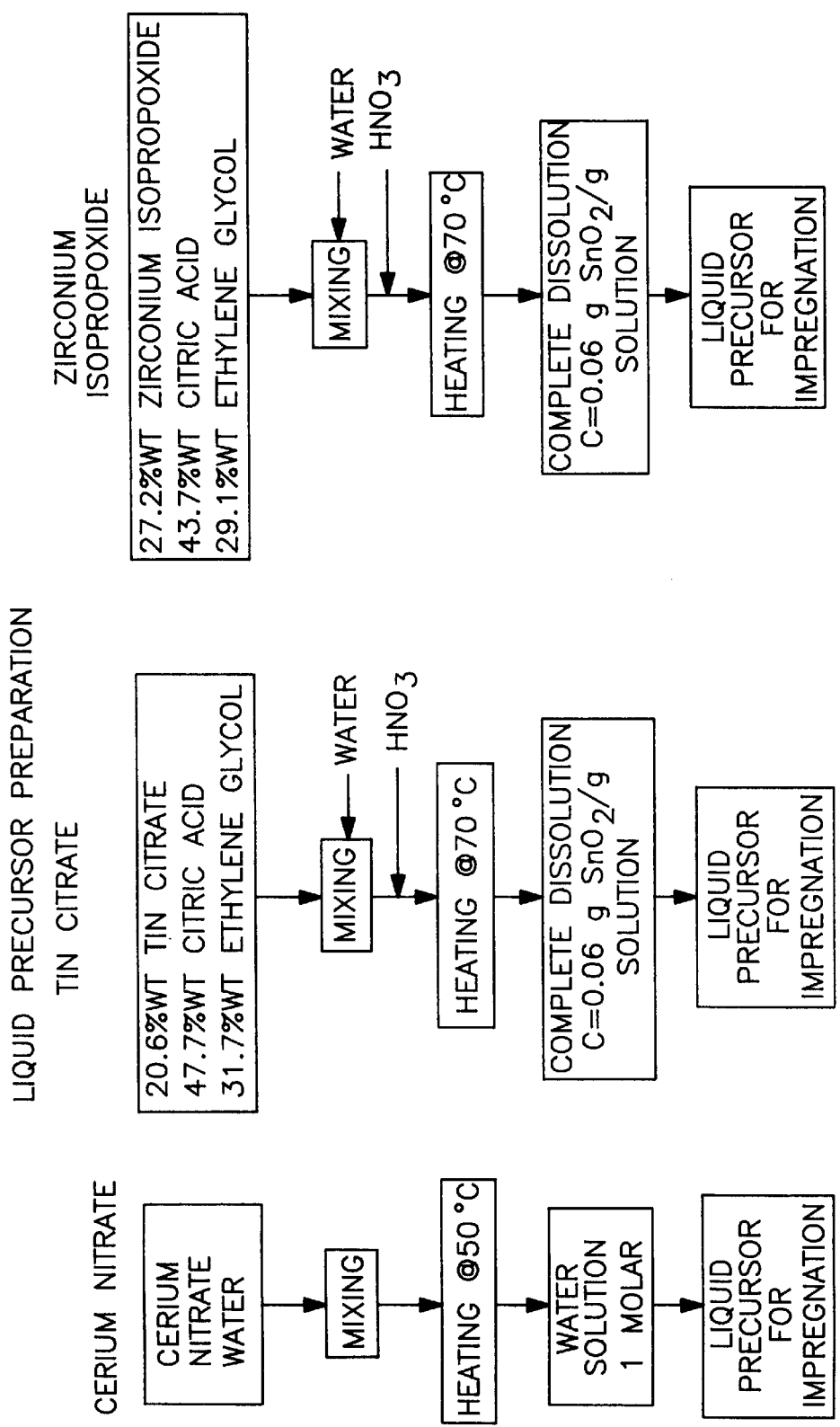
FIG. 1 shows preparative methods that may be used to make precursor solutions useful in carrying out the invention.

A number of refractories used in industrial furnaces have compositions containing silica. Examples include silica itself, mullite, alumina-zirconia-silica or AZS, dinas, fireclay, high duty, super duty, high alumina, low alumina, zircon and others. Many of these materials are attacked by vapors containing basic alkaline or alkaline-earth species. Particularly susceptible are silica-based materials with fine grains and high porosity.

Several studies have been undertaken to investigate the corrosion mechanism by which refractory materials are attacked during glass melting, in particular in furnaces using oxy-fuel combustion. It is thought that, at the high temperatures present in the furnace, solid alkaline or alkaline-earth metal oxides, for example $Na_2O$ or $K_2O$, undergo a phase transition from solid to gas. Gaseous oxides then diffuse and condense in the pores of the refractory. Gaseous alkaline or alkaline-earth metal oxides can also react with water vapor (one of the major products of combustion) to produce gaseous metal hydroxides which also diffuse and condense inside the pores. Within the pores, the liquid phase, rich in alkaline or alkaline-earth species, reacts with the silica matrix to produce metal silicates. It is further believed that the metal silicates produced in the reaction, in particular sodium and potassium silicates, exhibit relatively low viscosities and thus are easily removed from the refractory surface, resulting in a high rate of mass loss and wearing of the refractory. Phase transformations, such as, for example, from cristobalite to tridimite, changes in pore volume distributions and in apparent and skeletal densities have been observed experimentally in a number of silica-based refractories placed in oxygen fired glass furnaces.

To control, reduce or prevent the corrosive effects induced by high temperatures and corrosive species on a refractory, the invention employs the impregnation of such a refractory with a precursor which can be converted, by undergoing one or more transformations, into a material having different properties than the refractory matrix. The material produced by converting the precursor has protective properties against attack by corrosive species and is compatible with high temperature environments.

It is desirable that the protective material formed by converting the precursor be inert or less reactive towards the corrosive species than is the refractory matrix. In cases in which it is found that the protective material formed by converting the precursor does react with the corrosive species present in the furnace atmosphere and/or with the refractory matrix, it is preferred that the compounds produced, for example silicates of metals other than alkaline or alkaline earth elements, increase the viscosity of the liquid phase formed in the pores. This reduces the rates of mass loss, wearing and corrosion of the refractory.

A further advantage of having a protective material within the pores, crevices and surface irregularities of a refractory matrix is a reduction in the available volume in which condensation of corrosive vapors takes place. Moreover, the protective material reduces the surface area of the refractory matrix which comes in contact with the corrosive vapors.

Examples of precursors that can be used to impregnate refractory articles include but are not limited to metal salts, for example, metal nitrates, carbonates, chlorides, sulfates, acetates, citrates, oxalates, organometallic compounds, coordination (or complex compounds), metal alkoxides and other chemical compounds capable of being converted into the desired protective materials by undergoing physical, chemical and/or structural transformations.

In one preferred embodiment of the invention, the precursors are compounds which are liquids at ambient temperature. According to another preferred embodiment, the precursors are solids at ambient temperature and are dissolved, dispersed, suspended or emulsified in a suitable liquid medium; for example, the precursor may be dissolved in an aqueous or non-aqueous solvent or may be provided as a colloid in a suitable aqueous or non-aqueous liquid carrier.

Examples of the protective materials that are obtained from suitable precursors include but are not limited to compounds such as nitrides (AlN, $Si_3N_4$, BN, SiAlON), carbides (SiC, $B_4C$, TiC, ZrC, HfC, NbC, TaC, WC), borides ($TiB_2$, $ZrB_2$, $HfB_2$), silicides ($MoSi_2$, $Al_2Si_3$, $NbSi_2$, $TaSi_2$) and oxides ($ZrO_2$, $Y_2O_3$, $HfO_2$, $TiO_2$, $Cr_2O_3$, ZnO, $Nb_2O_5$, $Ta_2O_5$, $Al_2O_3$, $SnO_2$, $GeO_2$, $SiO_2$, $La_2O_3$, $CeO_2$), mixed metal oxides ($CaTiO_3$, $ZrTiO_4$, $Al_2TiO_5$, $MgAl_2O_4$, $CaAl_2O_4$, $CaZrO_3$, $BaZrO_3$) and compounds containing $Al_2O_3$ and $SiO_2$ (aluminosilicates, $3AlO_2.SiO_2$).

Examples of transformations that precursors undergo in order to be converted into desired protective materials include chemical reactions, in particular decompositions. Transformations may also involve molecular rearrangements, oxidations, hydrolysis, reactions involving nitrogen containing compounds, as well as other reactions. Dehydration, phase transitions and changes in the solid state structure are still other transformations that can take place to produce, from a suitable precursor, the desired protective material.

These transformations require the input of energy, for example in the form of thermal energy. In some cases, electromagnetic energy, for example in the visible, ultraviolet or vacuum ultraviolet regions of the spectrum, may also be used. Laser induced transformations, including single photon as well as multi-photon processes may also be used. Depending on the transformations sought, combinations of energy forms and energy sources may also be used.

In the practice of the invention, a refractory article is impregnated with the precursor. This can be accomplished by wetting or dipping the refractory article into a liquid precursor or into a precursor solution. An ultrasonic bath may further enhance the penetration of the precursor into pores, crevices, surface imperfections or irregularities of the refractory. Another impregnation technique involves painting the precursor liquid or precursor solution onto the surface of the refractory article. Spraying is still another possible means of applying the precursor onto the refractory article. In some cases, it may be desirable to repeat the impregnation process and/or to combine several impregnation techniques.

As the precursor is converted to protective material, refractory cavities become at least partially filled with the protective material. The surface area of the refractory which would be exposed to corrosive species, as well as the cavity volume available for corrosive vapor condensation, are thereby reduced. Increased adhesion between the refractory matrix and the protective material impregnated onto it is another benefit arising from good penetration of pores, crevices and irregularities of the refractory surface.

Once the refractory has been impregnated with the precursor, the precursor is subjected to various transformations to produce the desired protective material. As discussed above, heating is one convenient way of effecting one or more of these transformations. The temperatures and time periods for heating will depend on the type of precursor and the particular transformations that must take place to convert the precursor into the protective material. Generally, the temperature at the refractory surface may range from about 120° to about 1800° C., preferably from about 120° to 1000° C.

In one preferred embodiment of the invention, refractory articles are impregnated away from their point of use. According to this embodiment a protective material is formed upon refractory bricks, tiles, or other refractory articles before they are installed in a furnace or in other high temperature facilities which have corrosive environments.

In another preferred embodiment, refractory articles already in a furnace, or in other environments subject to high temperature and corrosive conditions, are impregnated with the protective material at their point of use. This approach is particularly advantageous during retrofitting a furnace or for the in-situ reconditioning of refractories within an existing facility.

Although the invention is particularly applicable for the production of corrosion-resistant refractories for use in glassmaking, it can be employed for use with other high temperature industrial processes during which refractories are exposed to corrosive environments. For example, the invention can be used to produce corrosion-resistant refractories for use in steel metallurgy, such as in blast furnace regenerators or during ore sintering, so that they are protected from attack by transition metal oxides.

The invention is described in further detail in the following examples which are presented to illustrate the invention and are not intended to be limiting. The examples relate to the production and testing of five refractory samples impregnated by one of the following protective materials: (a) cerium oxide, ceria or $CeO_2$, (b) tin oxide or $SnO_2$ and (c) zirconium oxide, zirconia, or $ZrO_2$. The phase composition and physical properties of the five refractory samples before impregnation are listed in Table I; Table II gives the properties of these samples.

TABLE I

| | | PHASE COMPOSITION (%) SAMPLE | | | | |
|---|---|---|---|---|---|---|
| | | #1 | #2 | #3 | #4 | #5 |
| TRIDYMITE | $T$-$SiO_2$ | 26 | 67 | 70 | 46 | 46 |
| CRISTOBALITE | $C$-$SiO_2$ | 55 | 33 | 30 | 53 | 36 |
| QUARTZ | $Q$-$SiO_2$ | 19 | — | — | — | 17 |
| BULK DENSITY | g/cm³ | 1.83 | 1.82 | 1.81 | 1.85 | 1.85 |
| SKELETAL DENSITY | g/cm³ | 2.26 | 2.27 | 2.25 | 2.2 | 2.19 |
| TOTAL POROSITY | % | 19.3 | 19.9 | 19.8 | 15.9 | 16.1 |

TABLE II

| | | Sample | | | | |
|---|---|---|---|---|---|---|
| | | #1 | #2 | #3 | #4 | #5 |
| Chemical Composition | | | | | | |
| % $SiO_2$ | | 95.5 | 96 | 96.0 | 96.0 | 97.0 |
| % $Al_2O_3$ | | 0.7 | 0.3 | 0.5 | 0.3 | 0.2 |
| % $Fe_2O_3$ | | 0.7 | 0.23 | 1 | 0.9 | 0.8 |
| % $ZrO_2$ | | | | | | |

TABLE II-continued

| | | Sample | | | | |
|---|---|---|---|---|---|---|
| | | #1 | #2 | #3 | #4 | #5 |
| % $TiO_2$ | | | 0.03 | | | |
| % CaO | | | | | | |
| % $Na_2O$ | | | 0.04 | | | |
| % $K_2O$ | | | 0.05 | | | |
| % ($Na_2O$ + $K_2O$) | | 0.25 | | | | |
| % CaO | | 2.5 | 2.6 | | | |
| % MgO | | | <0.3 | | | |
| Alkalies | | | | 0.12 | 0.07 | 0.05 |
| Refractoriness | SK | 34 | | 33 | 33 | 34 |
| Apparent Porosity | % | 20.5 | 20.5 | 19.0 | 19.0 | 19.0 |
| Specific Gravity | | | 2.34 | 2.32 | 2.32 | 2.33 |
| Bulk Density | g/cm³ | 1.82 | 1.83 | 1.85 | 1.88 | 1.88 |
| Thermal Expansion | % | | | 1.25 @ 1000° C. | 1.28 @ 1000° C. | 1.28 @ 1000° C. |

The flowcharts provided in FIG. 1 show the steps undertaken to prepare suitable precursors from the following three starting materials: cerium nitrate, tin citrate and zirconium isopropoxide. The precursors, in these cases in the form of precursor solutions, are then used to impregnate the five refractory samples, for example by immersion in an ultrasonic bath.

Figure 2:
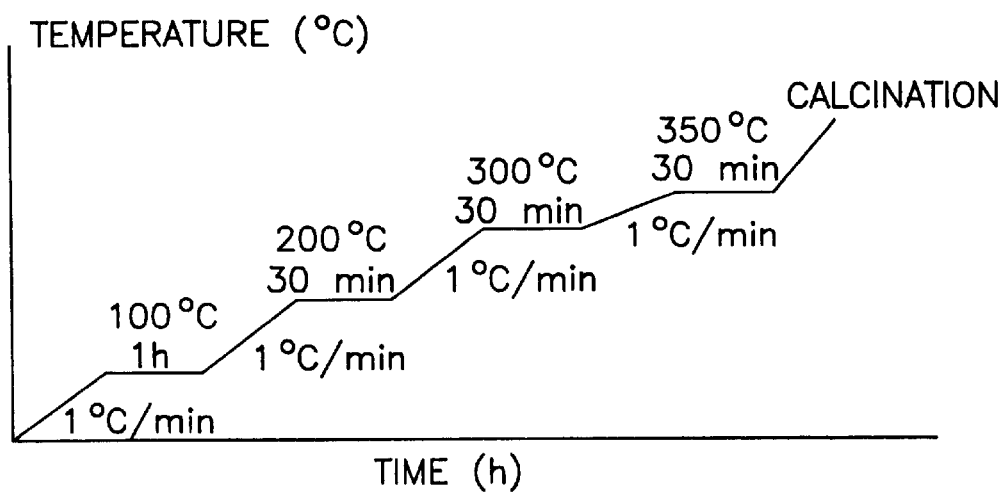
FIG. 2 shows an example of an organic burn-out heat treating cycle useful to carry out the invention.

The refractory samples impregnated with the precursor solutions are heated in order to drive off the liquid medium and to eliminate or pyrolyze organic groups, ligands or moieties. Details for the heating rates, temperatures and heating time periods used during the organic burn-out heat treating cycle are shown in FIG. 2.

Figure 3:
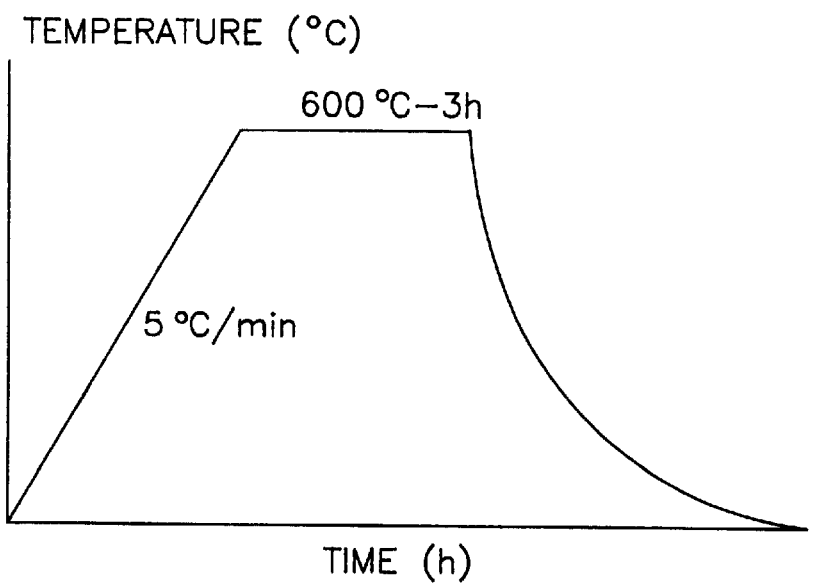
FIG. 3 shows a calcination heat treating cycle useful in carrying out the invention.

Once the organic (volatile) components are eliminated, additional transformations, for example the removal of the water of hydration and solid phase transitions, may be required in order to convert the precursor into the desired protective oxide material. FIG. 3 depicts a heat treating cycle undertaken in the calcination step.

It may be desirable to repeat the impregnation, organic burn-out and/or calcination steps. Each step may be repeated before going on to the next step or a sequence of steps may be first carried out and then repeated. In the examples provided here, the entire sequence of, impregnation, organic burn-out and calcination, was first carried out as described above, and was then repeated two more times.

The techniques used to characterize and compare impregnated and non-impregnated samples included X-ray diffraction (XRD) and mercury porosimetry for pore size, bulk density and pore size distribution.

Table III gives the content (weight percent) of metal oxide impregnated onto each of the five samples.

TABLE III

| | Content (weight %) | | |
|---|---|---|---|
| SAMPLE | $SnO_2$ | $ZrO_2$ | $CeO_2$ |
| #1 | 4.8 | 4.7 | 2.1 |
| #2 | 4.6 | 5.5 | 8.7 |
| #3 | 5.2 | 4.7 | 2.6 |
| #4 | 3.1 | 6.4 | 0.01 |
| #5 | 3.6 | 5.6 | 2.0 |

Figure 4:
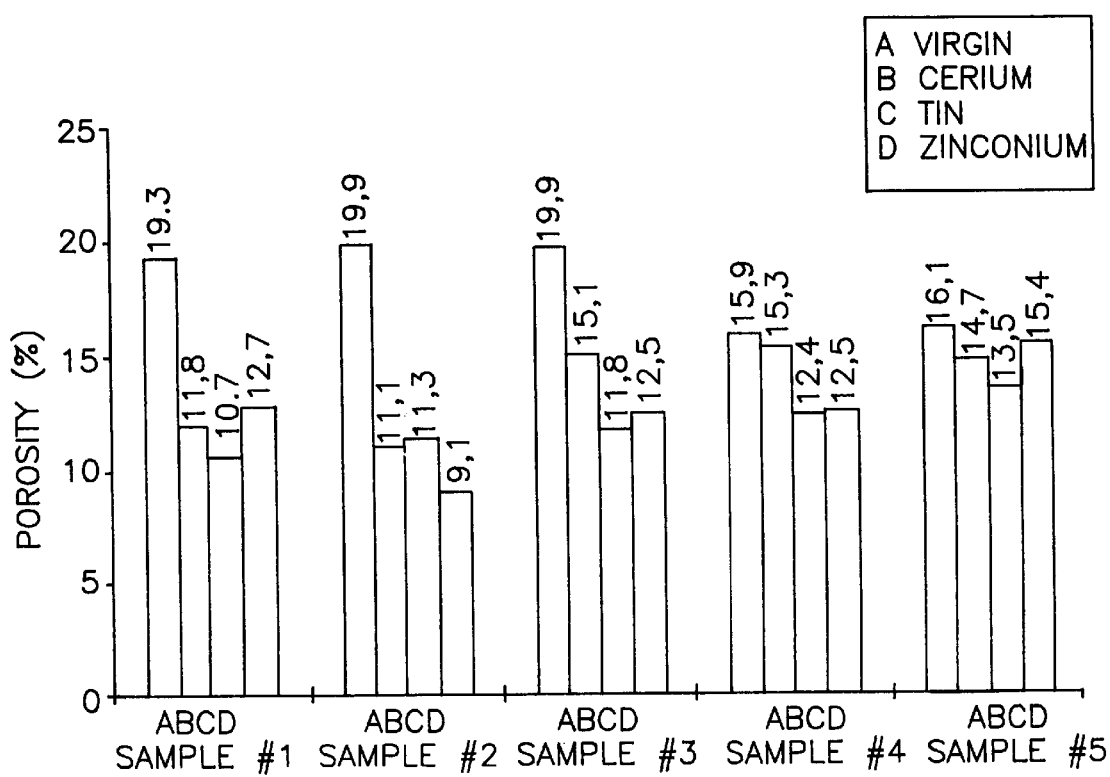
FIG. 4 shows the porosity of non-impregnated samples and of samples impregnated with metal oxides.

The effects of impregnation on sample porosities are shown in FIG. 4 which illustrates through graph bars that the porosities of samples impregnated with cerium oxide (B), tin oxide (C), and zirconium oxide (D) were lower than the porosities of the non-impregnated (virgin) silica refractories samples (A).

To evaluate the benefits of practicing the invention, the attack from corrosive vapors was determined in the five samples before and after impregnation with $SnO_2$, $ZrO_2$ or $CeO_2$. Corrosion effects were tested according to the American Society for Testing and Materials procedure ASTM C 987-88 (Reapproved 1993) entitled "Vapor Attack on Refractories for Furnace Superstructures". Since in oxygen-fired glass melting furnaces the effect of water is significant, the reactant chosen according to the guidelines of paragraph 5.1 of the ASTM C 987-88 standard was sodium hydroxide. For an additional comparison, the test was also carried out with high purity vitreous silica.

In order to help quantify the extent of corrosion, the volume corroded was measured using fine grain sand with known tap density whereby the mass of sand necessary to fill the cavities in the sample was determined before and after the sample was exposed to attack from the corrosive vapor.

Figure 5:
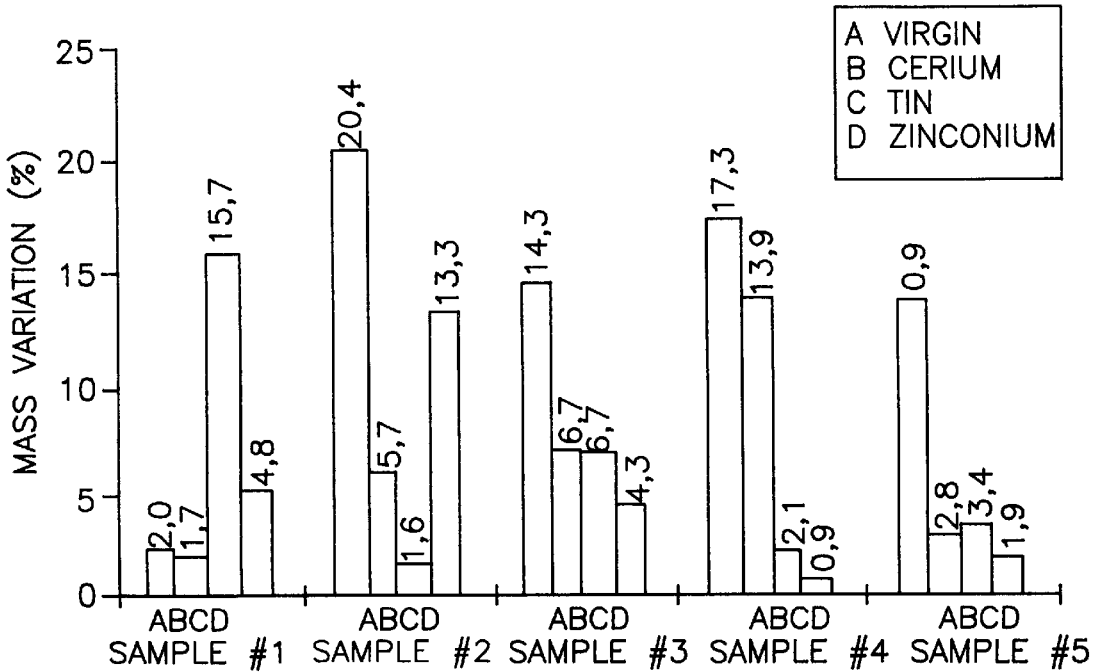
FIGS. 5 and 6 show, respectively, mass variations and corroded volume observed in five non-impregnated and impregnated samples after attack by corrosive vapors.
Figure 6:
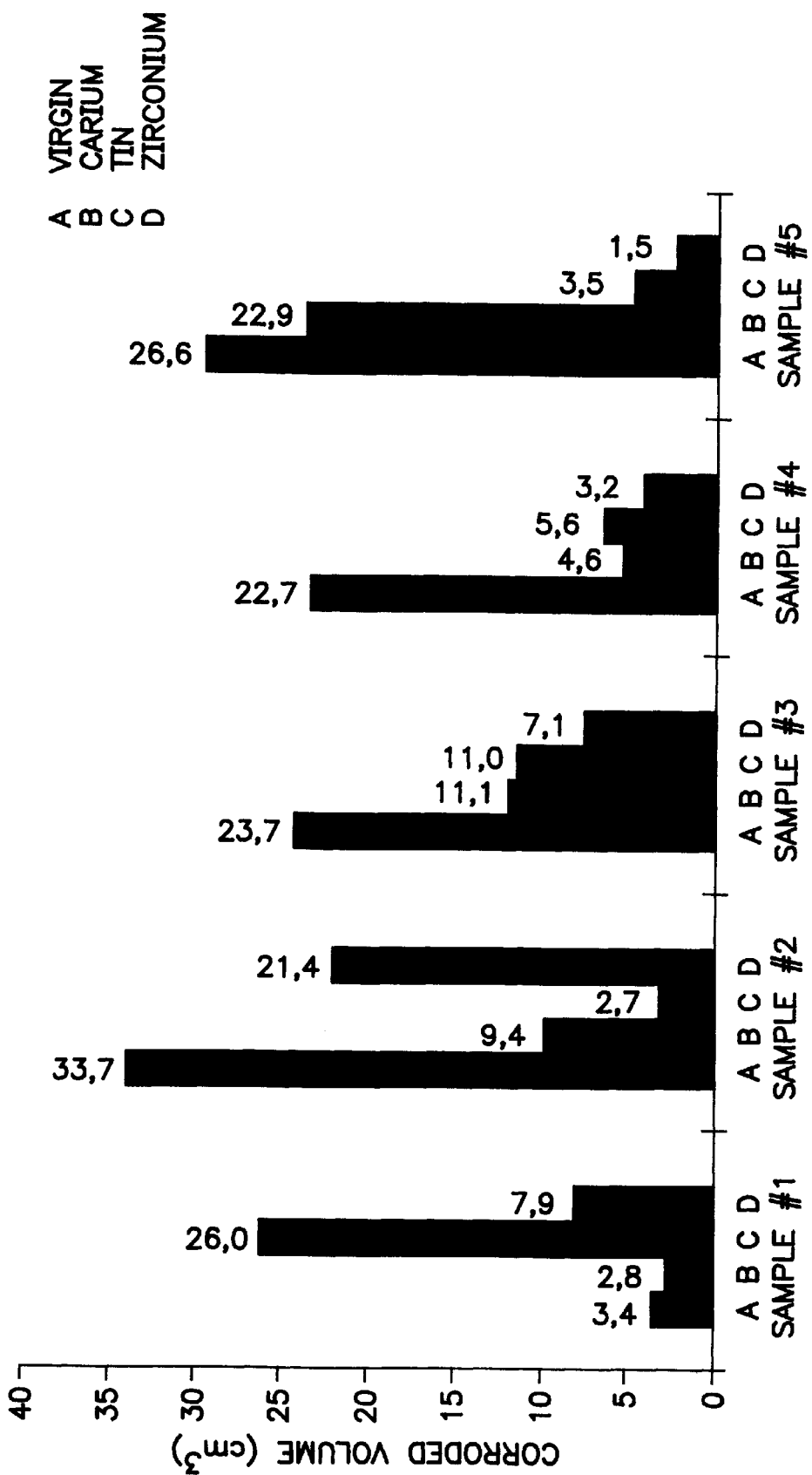

Mass variations and corroded volume observed in the impregnated and non-impregnated refractory samples after vapor attack are shown in FIGS. 5 and 6, respectively; for each sample shown in these two Figures, the graph bars from left to right correspond to: (A) the non-impregnated or virgin sample, (B) the sample impregnated with cerium oxide, (C) the sample impregnated with tin oxide and (D) the sample impregnated with zirconium oxide.

Visual inspection as well as mass variations (FIG. 5) and corroded volume (FIG. 6) indicate strong attack in the non-impregnated silica refractory samples. Non-impregnated samples also exhibit regions having a vitreous aspect, suggesting high incorporation of sodium.

All silica refractory samples impregnated with cerium oxide show a reduction in corrosion rate by sodium vapor. Impregnation with tin oxide results in a visible resistance against attack by vapors containing sodium species in samples #2, #3, #4 and #5. Samples #2, #3, #4 and #5 impregnated with zirconium oxide also show good resistance against attack from these vapors.

At first glance, impregnation with tin oxide and with zirconium oxide did not appear to render sample #1 more resistant against vapor attack. Upon further evaluation of the anomalous behavior of this sample, it was noted that sample #1 had a relatively high cristobalite content. As the phase transition from beta-cristobalite to alpha-critobalite is accompanied by volume expansion, it is believed that sample #1 was susceptible to cracking during heat treating. Since cracking would tend to increase the surface area exposed to attack by corrosive vapors, it is further believed that the results observed with this sample may have reflected the effects of sample cracking.

In the high purity vitreous silica sample, the sodium attack led to the formation of a modified layer, about 4 mm thick. This modified layer detaches easily revealing a nucleus that does not appear to have been attacked but which exhibits the beginning of microcracking.

Since the conditions of the ASTM C 987-88 are very severe, with the concentration of sodium species being considerably higher than that typically found in glass melting furnaces, it is shown that the invention can provide good silica-based refractories having corrosion resistance for use in glass melting operations.

What is claimed is:

1. A process for reconditioning a silica-based refractory already subjected to high temperature and corrosive conditions in a furnace, to improve the corrosion resistance of the silica-based refractory comprising:

(A) providing a silica-based refractory, having pores, and already subjected to high temperature and corrosive conditions in a furnace;

(B) impregnating the silica-based refractory with a metal salt precursor by passing the precursor into the pores of the refractory; and (C) providing energy to the silica-based refractory impregnated with said precursor, converting said precursor to a metal oxide, and at least partially filling said pores with said metal oxide which has a higher resistance to corrosion than does silica, and which increases the viscosity of any corrosive liquid that enters said pores.

2. The process of claim 1 wherein the silica-based refractory is impregnated with a precursor solution containing a liquid medium and wherein providing energy to the silica-based refractory impregnated with said precursor solution results in driving-off said liquid medium.

3. The process of claim 1 wherein the metal is from the group consisting of cerium, zirconium and tin.

4. The process of claim 1 wherein converting said precursor into said protective material comprises a chemical decomposition.

5. The process of claim 1 wherein converting said precursor into said protective material comprises a transformation in solid phase structure.

6. A process according to claim 1 wherein said silica-based refractory provided in (A) is already subjected to a temperature exceeding 2000° F.

* * * * *